(12) United States Patent
Ohman et al.

(10) Patent No.: US 8,914,033 B2
(45) Date of Patent: *Dec. 16, 2014

(54) METHOD OF PROVIDING A MOBILITY SERVICE

(71) Applicant: Core Wireless Licensing S.a.r.l., Luxembourg (LU)

(72) Inventors: Ville Ohman, Espoo (FI); Tero Makela, Helsinki (FI); Fabien Rapin, Vantaa (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 111 days.

This patent is subject to a terminal disclaimer.

(21) Appl. No.: 13/789,892

(22) Filed: Mar. 8, 2013

(65) Prior Publication Data

US 2013/0188602 A1  Jul. 25, 2013

Related U.S. Application Data

(63) Continuation of application No. 11/614,906, filed on Dec. 21, 2006, now Pat. No. 8,412,207.

(51) Int. Cl.
*H04W 40/00* (2009.01)
*H04W 36/14* (2009.01)
*H04L 29/14* (2006.01)
*H04W 80/04* (2009.01)

(52) U.S. Cl.
CPC .............. *H04W 36/14* (2013.01); *H04L 69/40* (2013.01); *H04W 80/04* (2013.01)
USPC ............ 455/445; 455/443; 370/310; 370/351

(58) Field of Classification Search
CPC ....... H04W 36/10; H04W 80/04; H04L 69/40
USPC .............. 455/436, 410, 435.1, 445, 443, 560; 370/335, 236, 342, 331, 230, 252, 310, 370/351, 238, 216; 726/5; 709/224
See application file for complete search history.

(56) References Cited

U.S. PATENT DOCUMENTS

| 7,990,913 | B2 | 8/2011 | Massiera et al. | |
| 8,290,498 | B2 | 10/2012 | Karaoguz et al. | |
| 2002/0131386 | A1* | 9/2002 | Gwon | 370/338 |
| 2002/0199019 | A1* | 12/2002 | Battin et al. | 709/245 |
| 2003/0100308 | A1 | 5/2003 | Rusch | |

(Continued)

FOREIGN PATENT DOCUMENTS

CN 1394091 A 1/2003
CN 1510877 A 7/2004

(Continued)

OTHER PUBLICATIONS

Extended European Search Report for EP Application No. 12186658.8 dated Nov. 2, 2012 (10 pages).

(Continued)

*Primary Examiner* — Mahendra Patel
(74) *Attorney, Agent, or Firm* — Winstead PC

(57) ABSTRACT

A method comprising running an application on user equipment; providing a mobility service; using a packet switched connection when said mobility service is unavailable; and using said mobility service when said mobility service becomes available.

17 Claims, 2 Drawing Sheets

(56) References Cited

U.S. PATENT DOCUMENTS

| | | | |
|---|---|---|---|
| 2003/0182431 A1* | 9/2003 | Sturniolo et al. | 709/227 |
| 2004/0095932 A1* | 5/2004 | Astarabadi et al. | 370/389 |
| 2004/0105413 A1 | 6/2004 | Menon et al. | |
| 2004/0162105 A1* | 8/2004 | Reddy et al. | 455/551 |
| 2005/0080884 A1* | 4/2005 | Siorpaes et al. | 709/223 |
| 2005/0130659 A1* | 6/2005 | Grech et al. | 455/436 |
| 2005/0135311 A1 | 6/2005 | Maillard | |
| 2005/0254469 A1 | 11/2005 | Verma | |
| 2005/0271011 A1 | 12/2005 | Alemany et al. | |
| 2005/0286466 A1* | 12/2005 | Tagg et al. | 370/329 |
| 2006/0034335 A1* | 2/2006 | Karaoguz et al. | 370/477 |
| 2006/0039327 A1 | 2/2006 | Samuel et al. | |
| 2006/0073831 A1 | 4/2006 | Guyot et al. | |
| 2006/0109819 A1 | 5/2006 | Marin et al. | |
| 2006/0133347 A1 | 6/2006 | Das | |
| 2006/0159088 A1 | 7/2006 | Aghvami | |
| 2006/0183472 A1 | 8/2006 | Nookala | |
| 2007/0135080 A1 | 6/2007 | Islam et al. | |
| 2007/0159976 A1 | 7/2007 | Dekeyzer et al. | |
| 2008/0227444 A1* | 9/2008 | Salomone et al. | 455/425 |

FOREIGN PATENT DOCUMENTS

| | | |
|---|---|---|
| EP | 1631033 A2 | 3/2006 |
| EP | 1746797 A3 | 1/2007 |
| WO | WO-2005/046280 | 5/2005 |

OTHER PUBLICATIONS

Zhao et al., Flexible network support for mobility. Mobicom 1998 Proceedings on the 4th Annual AMC/IEEE International Conference on Mobile Computing and Networking, Dallas, TX, Oct. 25-30, 1998, p. 145-156. (12 pages).

Kelkar et al., Mobile IP in 3G CDMA networks. Personal Wireless Communications, 2002 IEEE International Conference, Dec. 15-17, 2002, p. 41-44. (4 pages).

International Search Report and Written Opinion of the ISA for PCT Patent Application No. PCT/EP20071063546 (13 pages in total).

Bibliographic data (2 pages) including English Abstract for CN 1510877 cited in parallel CN application.

* cited by examiner

METHOD OF PROVIDING A MOBILITY SERVICE

CROSS-REFERENCE TO RELATED APPLICATIONS

This patent application is a continuation application of U.S. patent application Ser. No. 11/614,906, filed on Dec. 21, 2006 which is now U.S. Pat. No. 8,412,207. U.S. patent application Ser. No. 11/614,906 is incorporated herein by reference.

FIELD OF THE INVENTION

The present invention relates to a method of providing a mobility service, for example mobile IP, and user equipment comprising an application.

BACKGROUND OF THE INVENTION

A communications system is a facility which enables communication between two or more entities such as user terminal equipment and/or network entities as the nodes associated with a communication system. The communication may comprise, for example, communication of voice, electronic mail (email), text messages, etc.

The communication may be provided by a fixed line and/or wireless communication interface. A feature of wireless communication systems is that they provide mobility for the users thereof. An example of communications systems providing wireless communication are public land mobile networks (PLMN). An example of the fixed line system is a public switched telephone network (PSTN).

A communications system typically operates in accordance with a given standard or specification which sets out what the various elements of the system are permitted to do and how that should be achieved. For example, the standard or specification may define if the user, or more precisely user equipment, is provided with a circuit switched service or a packet switched service or both. Communication protocols and/or parameters which should be used for the connection also are typically defined. For example, the manner in which communication should be implemented between the user and the elements of the communication network is typically based on a predefined communication protocol. In other words, a specific set of "rules" on which the communication can be based need to be defined to enable to communication.

So-called "multi-homed" mobile devices (user equipment) have been proposed where IP (internet protocol) connectivity via access networks may appear and disappear due to mobility of the user equipment. For example, a multi-homed user equipment may be arranged to be capable of accessing a WLAN (wireless local area network) and a GPRS network (general packet radio service). A WLAN network is generally a localised network, for example run in the context of an office environment whereas the GPRS network is a public land mobile network. Typically, when the user equipment is in the office environment it is preferred that the user equipment accesses the WLAN network but when the user equipment leaves the office environment the user equipment accesses the GPRS network.

When the user equipment moves for example from the WLAN network to the GPRS network, or vice versa, the user equipment IP (Internet Protocol) address will change. The applications that are running in the user equipment can use a mobility service (such as mobile IP, if the network infrastructure is supported) or the application can manage connection breaks itself by reconnecting sockets after the moving from one network to another.

If the user equipment application has chosen to use a mobility service, such as Mobile IP, it may occur that a home agent (HA) is not reachable because the HA server is down or for example an internet link between the user equipment and the home agent server is down. This causes a problem that the applications running on the user equipment will not be able to automatically keep their source IP address unchanged and the sockets unbroken, if for example the user equipment moves from one network to another. Applications using mobile IP make the assumption that the mobility service works at all times and do not have the ability to cope with the problem caused by the home agent being unreachable. This results in a had user experience.

In more detail, the mobility service, such as mobile IP is normally used on top of a packet switched connection, such as IP. When the HA server is not reachable, the mobile IP implementation deactivates itself on the packet processing path of the user equipment TCP/IP (Transport control protocol/Internet Protocol) stack. In this case, the client application was able to continue using an IP connection if it was still working. However, it was not possible for the user equipment to resume the desired mobility service as it brings a seamless service to UE. Furthermore, because the mobile IP connection is broken, the IP address of the application was changed resulting in the existing sockets being broken without prior notice. This results in a breaking or discontinuity in a service being used by the user equipment.

It is therefore an aim of at least some embodiments of the present invention to address or at least mitigate one or more of the problems described.

SUMMARY

According to one aspect of the present invention, there is provided a method comprising running an application on user equipment; providing a mobility service; using a packet switched connection when said mobility service is unavailable; and using said mobility service when said mobility service becomes available.

According to another aspect of the invention, there is provided a method comprising providing an application on user equipment; using a first mobility service; and changing to a second packet switched connection mode when said first mobility service is unavailable; and changing from one network to another when said first service is unavailable, under the control of said application using said second connection mode.

According to a further aspect of the invention, there is provided a user equipment comprising an application configured to run on said user equipment; a mobility service entity configured to provide a mobility service; said user equipment being configured to use a packet switched connection when said mobility service is unavailable and to use said mobility service when said mobility service becomes available.

According to another aspect of the present invention, there is provided a user equipment comprising an application configured to use a mobility service and to change to a packet switched connection when said mobility service is unavailable, said user equipment being configured to be under the control of said application when said packet switched connection is used and said user equipment moves from one network to another.

According to another aspect of the present invention, there is provided a computer readable medium comprising an application to be run on user equipment, said application configured to control roaming of said user equipment when a mobility service is unavailable such that a packet switched connection is used.

According to another aspect of the present invention, there is provided a computer readable medium comprising a first executable component to cause an application to be run on user equipment; a second executable component configured to providing a mobility service; a third executable component configured to cause a packet switched connection to be used when said mobility service is unavailable; and a fourth executable component configured to cause said mobility service to be used when said mobility service becomes available.

According to another aspect of the present invention, there is provided a user equipment comprising means for running an application on user equipment; means for providing a mobility service; means for using a packet switched connection when said mobility service is unavailable; and means for using said mobility service when said mobility service becomes available.

BRIEF DESCRIPTION OF THE DRAWINGS

For a better understanding of the present invention, reference will now be made by way of example only to the accompanying drawings in which.

DETAILED DESCRIPTION OF EMBODIMENTS OF THE PRESENT INVENTION

As an example of mobility service, Mobile IP, used in some embodiments of the invention, provides an efficient, scalable mechanism for Error! Hyperlink reference not valid. within the Internet. Using Mobile IP, nodes may change their point-of-attachment to the Internet without changing their IP address. This allows them to maintain transport and higher-layer connections while moving. Node mobility is realized without the need to propagate host-specific routes throughout the Internet routing fabric.

In brief, Mobile IP works as follows. A mobile node can have two addresses—a permanent home address and a care-of address, which is associated with the network the mobile node is visiting. There are two kinds of entities in Mobile IP:

- A home agent stores information about mobile nodes whose permanent address is in the home agent's network.
- A foreign agent stores information about mobile nodes visiting its network. Foreign agents also advertise care-of addresses, which are used by Mobile IP.

A node wanting to communicate with the mobile node uses the home address of the mobile node to send packets. These packets are intercepted by the home agent, which uses a table and tunnels the packets to the mobile node's care-of address with a new IP header, preserving the original IP header. The packets are decapsulated at the end of the tunnel to remove the added IP header and delivered to the mobile node.

When acting as sender, the mobile node simply sends packets directly to the other communicating node through the foreign agent. If needed, the foreign agent could employ reverse tunneling by tunneling mobile node's packets to the home agent, which in turn forwards them to the communicating node.

Figure 1:
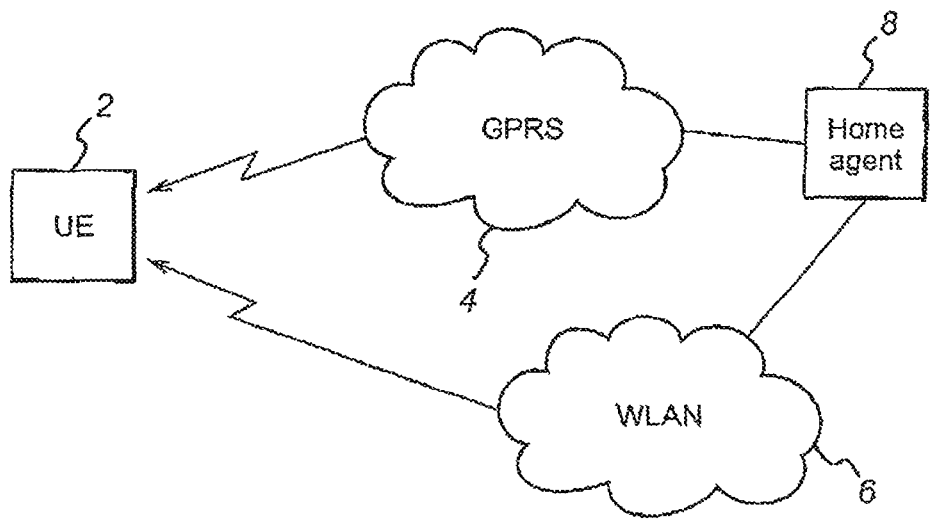
FIG. 1 shows a network environment in which embodiments of the present invention can be used.

FIG. 1 is a highly schematic view of the environment in which embodiments of the present invention can be provided. User equipment 2 can be any suitable device. It may for example be a mobile station, a mobile phone, a personal data assistant, a personal organiser, a portable computer or any other suitable functionality.

The user equipment 2 is able to communicate packet data either via a GPRS network 4 or a WLAN network 6. The GPRS network is for example in accordance with the 3GPP standards ($3^{rd}$ Generation Partnership Project). The WLAN network 6 may be in accordance with the WLAN standards 802.11x, or the like.

In the embodiment shown in FIG. 1, both of the networks are packet data networks. It should be appreciated that in alternative embodiments of the present invention, any two packet data networks can be used. It should be appreciated that in embodiments of the present invention the user can move between more than two packet data networks and accordingly the user equipment is capable of connecting to more than two packet data networks. The two packet data networks are not necessarily different and may be of the same type.

A home agent 8 is part of the user equipment's home network and can be accessed via the GPRS network 4 or the WLAN network 6. The home agent 8 has a binding cache which is able to map various addresses of user equipment. In particular, the home agent makes sure that when the IP address of the user equipment 2 changes that any packets intended for the user equipment can be directed correctly to that user equipment. The home agent thus acts as a register with details of an IP address or addresses of user equipment. The IP addresses maybe relatively static or may change relatively often.

Embodiments of the invention may be used where a mobility service becomes unreachable or becomes reachable. When mobility service is used, the switching between connections is transparent to applications because the mobility service hides the mobility from the applications. When the mobility service is not available, the user equipment may need to change its IP address, close and reopen sockets.

In a packet switched network such as an IP network, if without a mobility service, moving of an UE between networks means a connection break and reconnection from the viewpoint of the application. In the packet switched connection mode, an application can be notified about a preferred connection in order to help it make a decision. In embodiments of the invention, a mechanism is provided for moving from the mobility service mode to the packet switched connection mode and/or vice-versa, depending on the availability of the mobility service.

In embodiments of the invention, a mobility service such as mobile IP is used on top of a packet switched connection such as IP connection. When the HA is down or a link between the HA and the user equipment is broken, there will be no mobility service. In embodiments of the invention, when this occurs, the connection is downgraded to a packet switched connection such as an IP connection and then the mobility service is resumed when it is available.

Figure 4:
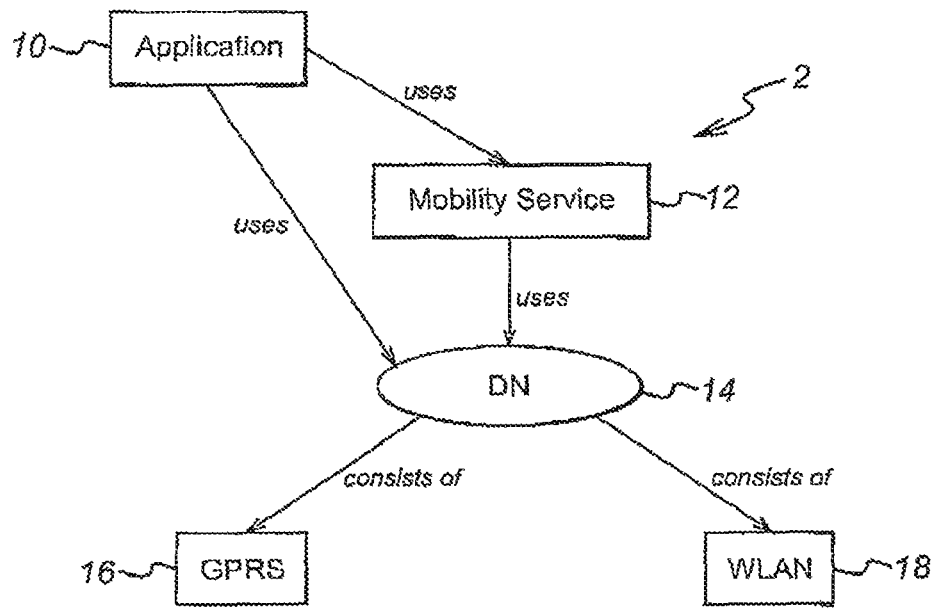
FIG. 4 shows a block diagram of user equipment embodying the present invention.

Reference is now made to FIG. 4 which schematically shows functionality of user equipment embodying the present invention. The user equipment has an application functionality 10 which uses a mobility service functionality 12. The mobility service is effectively partly implemented in the user equipment and partly in the network. The network provides a service for the user equipment but for an application running on the user equipment, the user equipment implementation of the mobility service, for example mobile IP, can also be regarded as a mobility service. For example, the mobile IP protocol requires the home agent (a server in the network) and mobile IP protocol information for the terminal equipment (UE). In other words, the mobile station needs to be able to support mobile IP.

The application functionality 10 and the mobility service functionality 12 are both arranged to use the destination network 14. The destination network 14 consists of a group of accesses 16 and 18, each access leading to a certain packet switched network, such as an IP network providing a certain set of services. In the embodiment shown in FIG. 4 the access consist of a GPRS 16 and a WLAN 18. The accesses are arranged so that the destination network will have a selection policy parameter in order to determine which of the available accesses are selected. For example, one access may be given a priority over another. Alternatively, any other suitable selection policy can be used.

An example of the destination network is a home WLAN, burger WLAN, and operator GPRS. Each of these accesses leads to the Internet. Besides the issue of the availability of above mentioned accesses, normally a connection providing higher data rate, e.g. WLAN, may be preferred.

Figure 2:
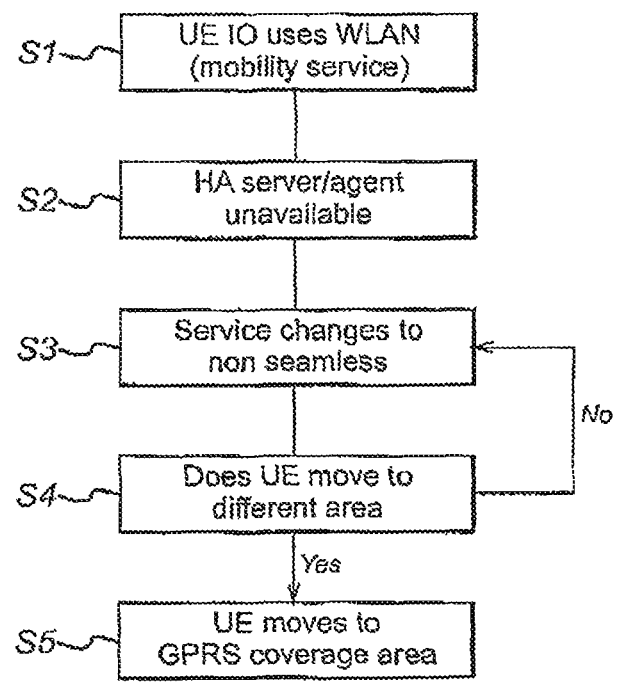
FIG. 2 shows a flow diagram of a method embodying the present invention where a mobility service fails.

Reference is now made to FIG. 2 which shows a method used in embodiments of the present invention when a mobility service fails.

In step S1, the user equipment application 10 uses the mobility service functionality 12 which is configured to use the destination network. In this embodiment, the WLAN access is first used, by way of example. In step S1, it is assumed that the user equipment is using a mobility service, for example mobile IP, via the WLAN. Thus, initially, a seamless service is provided. By seamless, this is meant that the application running on the user equipment does not need to react when the interface changes. The application sockets do not break and the operation continues as before. In this way, any breaks in the connectivity can be minimised. The IP address is unchanged. The mobility service, for example mobile IP, is running on top of the packet switch connection, for example, an IP connection.

In step S2, the HA server or agent 8 is no longer available either because the Internet via which the home agent is accessed or the home agent server itself is not working.

In step S3, the user equipment reacts to this. In particular, the middleware on the user equipment informs the application functionality 10 that the mobility service is not available, and that connection should be downgraded to WLAN connection and the service type is now non-seamless. In other words, the access is unchanged but the service type is changed to non-seamless. Non-seamless means that the application functionality needs to react because the terminal IP address may change, the sockets may be closed and reopened. The application functionality 10 closes and reopens its socket because of the change in its source IP address. There is therefore no mobility service any more and the connection is downgraded to a packet switched connection such as an IP connection.

Middleware is the software that runs on the user equipment. The applications use middleware and middleware uses hardware dependent software.

In step S4, a determination is made as to whether or not the user has moved to a GPRS coverage area. If the user does not move, then the user equipment continues to operate as described in relation to step S3. If not, the next step will be step S5.

If the user moves to a GPRS coverage area, the next step is step S5. The user equipment will switch to GPRS if the user equipment moves out of the WLAN coverage area. As the mobility service is unavailable, the application functionality is required to intervene. The application functionality is signalled that it needs to take action to move to the GPRS system. For example, in one embodiment of the present invention, the application functionality 10 automatically inherits the destination network (i.e. the access for the GPRS network) from the mobility service functionality that it is to use. The destination network is a group of accesses that can be used to access a certain service. The mobility service handles mobility between different networks. If a mobility service, for example mobile IP, suddenly becomes unreachable, then the client application's data connection inherits the destination network that the mobility service, for example mobile IP, were managing. That way application can be notified directly when change happens in its connection environment, e.g. when a more preferable access becomes available (if the mobility service, for example mobile IP, was available, it would have handled the change of network, but because it has become unreachable, the application has to do it). The connection is still a packet switched connection such as an IP connection.

In the case where the user equipment stays within the WLAN coverage, the user equipment functions as described in relation to step S3 and does not progress to step S5. Thus the user equipment will stay with the WLAN access network, It should be appreciated, that in some embodiments of the invention, that WLAN and GPRS both provide the user equipment with a mobility service, for example mobile IP, on top of the packet switched connection such as an IP connection. Thus the scenario set out in FIG. 2 can be replaced with the UE initially using a GPRS connection in step S1, with a seamless service being provided. In other words a mobility service can be provided initially by the GPRS network in step S1. In this alternative scenario, in step S5, the UE can move from the GPRS area to the WLAN area. The access networks are by way of example only.

Figure 3:
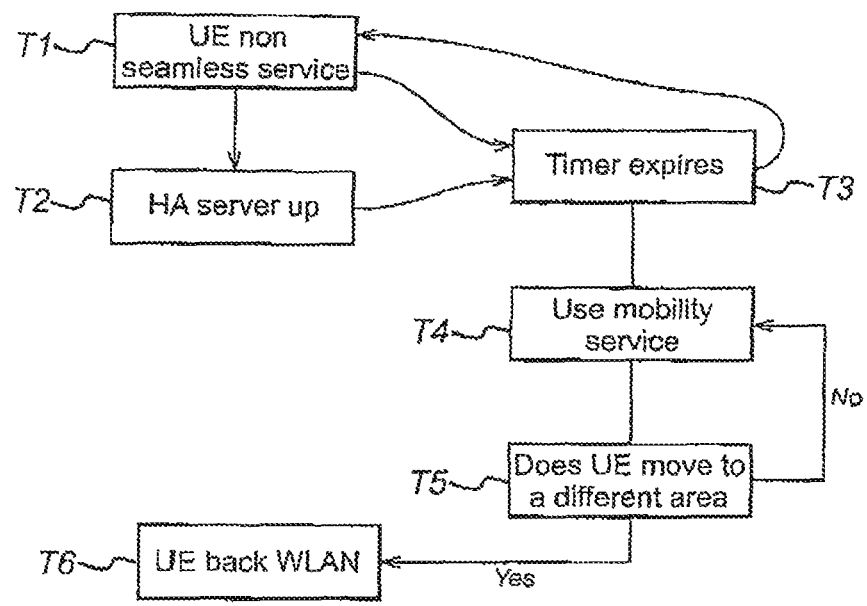
FIG. 3 shows a method embodying the present invention where the previously unavailable mobility service becomes available.

FIG. 3 shows an embodiment of the present invention where following the scenario discussed in relation to FIG. 2, the mobility service is available again in other words, a connection to the HA server is once again available or the HA server itself is available.

In step T1, the user equipment is operating in a non-seamless manner and is for example connected to GPRS. The connection used is thus the packet switched connection such as an IP connection. However, the user equipment may be connected to WLAN as outlined in the alternative scenario above. Depending on the scenario, the service used step T1 corresponds to that of step S3 or step S5

In step T2, the HA server in the network is up.

In the terminal there is a periodic timer. FIG. 4 describes the relationship between entitles inside phone. The Mobility Service functionality 12 contains the implementation of mobility service (i.e. mobile IP). The timer is for example started when it is determined that the HA server is not available. Once the timer has expired, the user equipment tried to reconnect again to the HA. In this embodiment shown in FIG. 3, the HA server is now available. Otherwise, the periodic timer is reset and will count down a predetermined amount of time and step T3 will be repeated. Thus in some embodiments of the invention, step T3 will follow directly after step T1, where the HA server is for example still unavailable. The method will progress to step T4 only when a connection has been made to the HA server.

In step T4, the middleware informs the application functionality that the mobility service access is again preferred.

The application functionality signals the middleware to resume a mobility service when there is a suitable moment for the application functionality. After the mobility service is resumed, the application closes and reopens its socket because the source IP address changes. In other words, mobility service, for example mobile IP, on top of the switched packet connection, that is the IP connection is again used.

It is checked in step T5 if the user returns to the area of the WLAN coverage from the GPRS coverage area. If so the next step is T6. The mobility service automatically changes the application sockets to the WLAN access without application intervention or changing IP address.

In the case where the user equipment remains in the GPRS coverage area, with no WLAN coverage being available, no application intervention is required. In other words the method remains at step T4.

In the alternative scenario, where the user is in the WLAN coverage area, the user may return to the GPRS coverage area although WLAN may be generally preferred as it normally offers higher data rate.

Embodiments of the present invention may include an additional step of finding an available access. This can be carried out prior to, for example, step S1. This step may additionally or alternatively be carried out when the user equipment moves out of range of one coverage area or when the signal strength falls below a given value.

Thus, embodiments of the present invention provide a way to preserve application connectivity and mobility where a mobility service fails. A way of providing a return to seamless service is also described. Reference is made to the code below which describes the logic used by the user equipment to inform the application functionality on changes in the mobility protocol registration status and allowing a smooth adaptation to changes.

Middleware Implementation in Pseudo Code:

```
IF(mobile IP instance is registered to HA)
{
  IF(home registration fails after retrying multiple times)
  {
    DowngradeAll( );
  }
}
ELSE
{
  IF(home registration succeeds)
  {
    UpgradeAll( );
  }
  ELSE
  {
    TryAgainAfterTimeout;
  }
}
FUNCTION DowngradeAll( )
{
  FOR (each connection handle i in every application)
  {
    IF(i uses the particular mobility service)
    {
      Associate i with mobility service's DN;
      Run signalling procedure with i so that the
      best access of the DN is selected for i;
    }
  }
}
```

-continued

```
FUNCTION UpgradeAll( )
{
  FOR (each connection handle i in every application)
  {
    IF(i originally used the particular mobility service)
    {
      Run signalling procedure with i so that the
      mobility service is again associated with i;
    }
  }
}
```

This can be summarised if the user equipment is registered to the home agent and the home registration fails after trying a predetermined number of times (predetermined number of times can be one or more) then there is a downgrade to the non-seamless type of service, that is to a packet switched connection such as IP connection. On the other hand, if the home registration succeeds then there is an upgrade to the seamless operation (see step T4 of FIG. 3) enabled by mobility service running on top of the packet switched connection. The possibility of retrying after a timeout period is also given if the home registration is not successful.

For the downgrade function, for each connection handled in every application, it is determined if the particular connection handle uses the particular mobility service. If so, the particular connection handle is associated with a mobility services destination network. A signalling procedure is run for the particular connection handle so that the best access of the destination network is selected for the particular connection handle.

For the upgrade function, for each connection handle in every application, if a given connection handle is originally using a particular mobility service, then the signalling procedure for the connection handle is run so that the mobility service is again associated with a particular connection handle.

Embodiments of the present invention are particularly advantageous in that connectivity and mobility is preserved and the end user's seamless experience may be improved. The seamless service may be easier to deploy because the applications are often offered mechanisms to adapt to real life situations. Because all application react in a similar way and no ad hoc problem solution attempts are implemented in the applications, embodiments of the present invention may mean that the system overall behavior may be easier to predict.

Embodiments of the present invention may be particularly advantageously used in more intelligent devices such as smart phones and PDA devices. However, embodiments of the present invention are not limited to such applications.

Embodiments of the present invention can be included in any suitable network in accordance with any appropriate standard. Embodiments of the present invention may for example be implemented in the mobile IP standards proposed by the IETF (Internet engineering task forces) the Moblke standard, WLAN technology and 3GPP standards.

In embodiments of the present invention, the home agent may be replaced by any other suitable entity. For example, with the Moblke standard, the communication may be instead with a VPN gateway.

Embodiments of the present invention can also be applied in the context of the first session opening. In that way, the application would get knowledge of the connection as originally based on mobility service such as mobile IP or not, in other words whether it should handle the connections by itself or not. Thus in embodiments of the present invention the application running on the user equipment implements a signalling protocol and reacts according to it. This also occurs after the first connection has been established.

An advantage of embodiments of the present invention is that there is earlier information of a lost connection from the middle layer so that the application does not need to wait for a lost TCP session message or similar.

It should be appreciated that embodiments of the present invention can be implemented at least partly by a computer program.

Although described in the context of particular embodiments, it will be apparent to those skilled in the art that a number of modifications and various changes to these teachings may occur. Thus whilst the invention has been particular shown and described with respect to one or more preferred embodiments thereof, it will be understood by those skilled in the art that certain modifications or changes, in form and shape, may be made therein without departing from the scope and spirit of the invention as set forth above.

The invention claimed is:

1. A method comprising:
   running an application on user equipment having mobility service functionality;
   using the mobility service functionality of the user equipment to receive packets from a home agent of a mobility service, the mobility service allowing the user equipment to change point-of-attachment to the Internet without changing source IP address, the mobility service functionality allowing transparent network connection to the application;
   determining that the home agent of the mobility service has become unavailable; and
   in response to determining that the home agent of the mobility service has become unavailable, notifying the application of the need to change the source IP address and causing the application to inherit a destination network from the mobility service functionality; and
   making a reconnection to the home agent, and in response to making a reconnection to the home agent, informing the application that mobility service is again available.

2. The method as claimed in claim 1, comprising periodically trying to reconnect to the home agent after determining that the home agent has become unavailable.

3. A non-transitory computer readable medium comprising program code adapted to perform the method of claim 1 when the program code is run on a processor.

4. A method comprising:
   running an application on user equipment having mobility service functionality for receiving packets from a home agent of a mobility service, wherein the mobility service allows the user equipment to change point-of-attachment to the Internet without changing source IP address, the mobility service functionality allows transparent network connection to the application, and the application is notified of the need to change the source IP address when a home agent of the mobility service has become unavailable;
   determining that the home agent of the mobility service has become unavailable;
   periodically trying to reconnect to the home agent after the determining that the home agent has become unavailable; and
   in response to making a reconnection to the home agent, informing the application that mobility service is again available.

5. The method as claimed in claim 4, the method comprising causing the application to inherit a destination network from the mobility service functionality in response to determining that the home agent of the mobility service has become unavailable and notifying the application of the need to change the source IP address.

6. The method as claimed in claim 5, wherein the destination network is a general packet radio service, GRPS, network or a wireless local area network, WLAN.

7. The method as claimed in claim 5, wherein the destination network is the last destination network that the mobility service functionality was managing prior to determining that the home agent of the mobility service has become unavailable or the best access available for the application.

8. The method as claimed in claim 4, further comprising receiving a signal from the application to resume mobility service functionality.

9. The method as claimed in claim 8, wherein discontinuation or resuming of the mobility service causes a change in the source IP address.

10. A non-transitory computer readable medium comprising program code adapted to perform the method of claim 4 when the program code is run on a processor.

11. An apparatus for a user equipment, the apparatus being adapted to:
    run an application on the user equipment;
    provide mobility service functionality for receiving packets from a home agent of a mobility service and for allowing transparent network connection to the application, the mobility service allowing the user equipment to change point-of-attachment to the Internet without changing source IP address;
    determine that the home agent of the mobility service has become unavailable; and
    in response to determining that the home agent of the mobility service has become unavailable, notify the application of the need to change the source IP address and cause the application to inherit a destination network from the mobility service functionality; and
    make a reconnection to the home agent, and in response to making a reconnection to the home agent, informing the application that mobility service is again available.

12. The apparatus as claimed in claim 11, wherein the destination network is a general packet radio service, GRPS, network or a wireless local area network, WLAN.

13. The apparatus as claimed in claim 11, wherein the destination network is the last destination network that the mobility service functionality was managing prior to determining that the home agent of the mobility service has become unavailable or the best access available for the application.

14. An apparatus for a user equipment, the apparatus being adapted to:
    run an application on user equipment;
    provide mobility service functionality for receiving packets from a home agent of a mobility service and for allowing transparent network connection to the application, the mobility service allowing the user equipment to change point-of-attachment to the Internet without changing source IP address;
    determine that a home agent of the mobility service has become unavailable and to notify the application of the need to change the source IP address in response thereto;
    periodically try to reconnect to the home agent after the determining that the home agent has become unavailable; and in response to making a reconnection to the home agent, inform the application that mobility service is again available.

15. The apparatus as claimed in claim 14, adapted further to cause the application to inherit a destination network from the mobility service functionality in response to determining that the home agent of the mobility service has become unavailable and notifying the application of the need to change the source IP address.

16. The apparatus as claimed in claim 14, wherein the destination network is a general packet radio service, GRPS, network or a wireless local area network, WLAN.

17. The apparatus as claimed in claim 14, wherein the destination network is the last destination network that the mobility service functionality was managing prior to determining that the home agent of the mobility service has become unavailable or the best access available for the application.

* * * * *